United States Patent
Liu et al.

(10) Patent No.: US 10,225,818 B2
(45) Date of Patent: Mar. 5, 2019

(54) PAGING USER EQUIPMENTS ON A SHARED COMMUNICATION MEDIUM

(71) Applicant: QUALCOMM Incorporated, San Diego, CA (US)

(72) Inventors: Chih-Hao Liu, San Diego, CA (US); Srinivas Yerramalli, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/870,824

(22) Filed: Jan. 12, 2018

(65) Prior Publication Data

US 2018/0242277 A1    Aug. 23, 2018

Related U.S. Application Data

(60) Provisional application No. 62/462,212, filed on Feb. 22, 2017.

(51) Int. Cl.
*H04L 5/00* (2006.01)
*H04W 72/12* (2009.01)
(Continued)

(52) U.S. Cl.
CPC ........... *H04W 68/02* (2013.01); *H04L 5/0048* (2013.01); *H04W 8/005* (2013.01); *H04W 16/14* (2013.01);
(Continued)

(58) Field of Classification Search
CPC ......... H04L 5/0053; H04L 1/08; H04L 1/189; H04L 1/001; H04W 72/042; H04W 16/32;
(Continued)

(56) References Cited

U.S. PATENT DOCUMENTS 9,215,058 B2 * 12/2015 Heo .................. H04L 5/001
9,467,993 B2 * 10/2016 Seo ................. H04W 72/042
(Continued)

FOREIGN PATENT DOCUMENTS

WO    2016072770 A1    5/2016

OTHER PUBLICATIONS

Ericsson: "Future Compatibility for Operating NR in Unlicensed Spectrum", 3GPP Draft; R2-1700902—Future Compatibility for Operating NR in Unlicensed Spectrum, 3rd Generation Partnership Project (3GPP), Mobile Competence Centre; 650, Route Des Lucioles; F-06921 Sophia-An, vol. RAN WG2, No. Athens, Greece; Feb. 13, 2017-Feb. 17, 2017, Feb. 12, 2017 (Feb. 12, 2017), 5 pages, XP051211678, Retrieved from the Internet: URL: http://www.3gpp.org/ftp/Meetings_3GPP_SYNC/RAN2/Docs/ [retrieved on Feb. 12, 2017] paragraph [2.1.2].

(Continued)

Primary Examiner — Liton Miah
(74) Attorney, Agent, or Firm — Muncy, Geissler, Olds & Lowe, P.C.

(57) ABSTRACT

In an embodiment, an apparatus (e.g., eNB) pages UEs on a shared communication. The apparatus obtains paging message(s) for transmission to UEs with different coverage levels. The apparatus transmits an extended common ePDCCH, followed by a paging ePDCCH, followed by repetitive transmissions of the paging message(s) over a plurality of PDSCH subframes. In a further embodiment, the apparatus obtains first and second sets of paging messages for transmission to different paging groups. The apparatus establishes non-overlapping POWs for the first and second paging groups to avoid a paging ePDCCH collision.

10 Claims, 15 Drawing Sheets

(51) Int. Cl.
 *H04W 68/02* (2009.01)
 *H04W 72/04* (2009.01)
 *H04W 8/00* (2009.01)
 *H04W 16/14* (2009.01)
 *H04W 28/04* (2009.01)

(52) U.S. Cl.
 CPC ........ *H04W 72/0446* (2013.01); *H04W 28/04* (2013.01)

(58) Field of Classification Search
 CPC ........... H04W 52/244; H04W 72/0446; H04W 72/12; H04W 84/047
 See application file for complete search history.

(56) References Cited

U.S. PATENT DOCUMENTS

| 9,648,582 | B2 | 5/2017 | Burbidge et al. | |
|---|---|---|---|---|
| 9,843,429 | B2* | 12/2017 | Yi | H04W 4/70 |
| 9,924,534 | B2* | 3/2018 | Yi | H04L 5/001 |
| 10,015,002 | B2* | 7/2018 | Seo | H04L 5/001 |
| 2011/0222491 | A1* | 9/2011 | Vajapeyam | H04L 1/0038 370/329 |
| 2014/0098761 | A1* | 4/2014 | Lee | H04W 74/006 370/329 |
| 2015/0215906 | A1* | 7/2015 | Park | H04W 72/12 370/312 |
| 2015/0264677 | A1 | 9/2015 | He et al. | |
| 2016/0044652 | A1 | 2/2016 | Xue et al. | |
| 2016/0057731 | A1 | 2/2016 | Damnjanovic et al. | |
| 2016/0100380 | A1 | 4/2016 | Jha et al. | |
| 2016/0242203 | A1* | 8/2016 | You | H04W 4/70 |
| 2017/0347335 | A1 | 11/2017 | Yi et al. | |
| 2017/0366328 | A1 | 12/2017 | Seo et al. | |

OTHER PUBLICATIONS

International Search Report and Written Opinion—PCT/US2018/014174—ISA/EPO—Jul. 19, 2018.
Kadous T., et al., "Understanding MulteFire's Radio Link", Oct. 1, 2016 (Oct. 1, 2016), 21 Pages, XP055374063, Retrieved from the Internet: URL: http://www.multefire.org/wp-content/uploads/2016/10/MulteFire_Radio-Link.pdf [retrieved on May 18, 2017].
"MulteFire Release 1.0 Technical Paper a New Way to Wireless", Jan. 20, 2017 (Jan. 20, 2017), pp. 1-25, XP055446360, Retrieved from the Internet: URL: https://www.multefire.org/wp-content/uploads/MulteFire-Release-1.0-whitepaper_FINAL.pdf.
Partial International Search Report—PCT/US2018/014174—ISA/EPO—May 28, 2018.

* cited by examiner

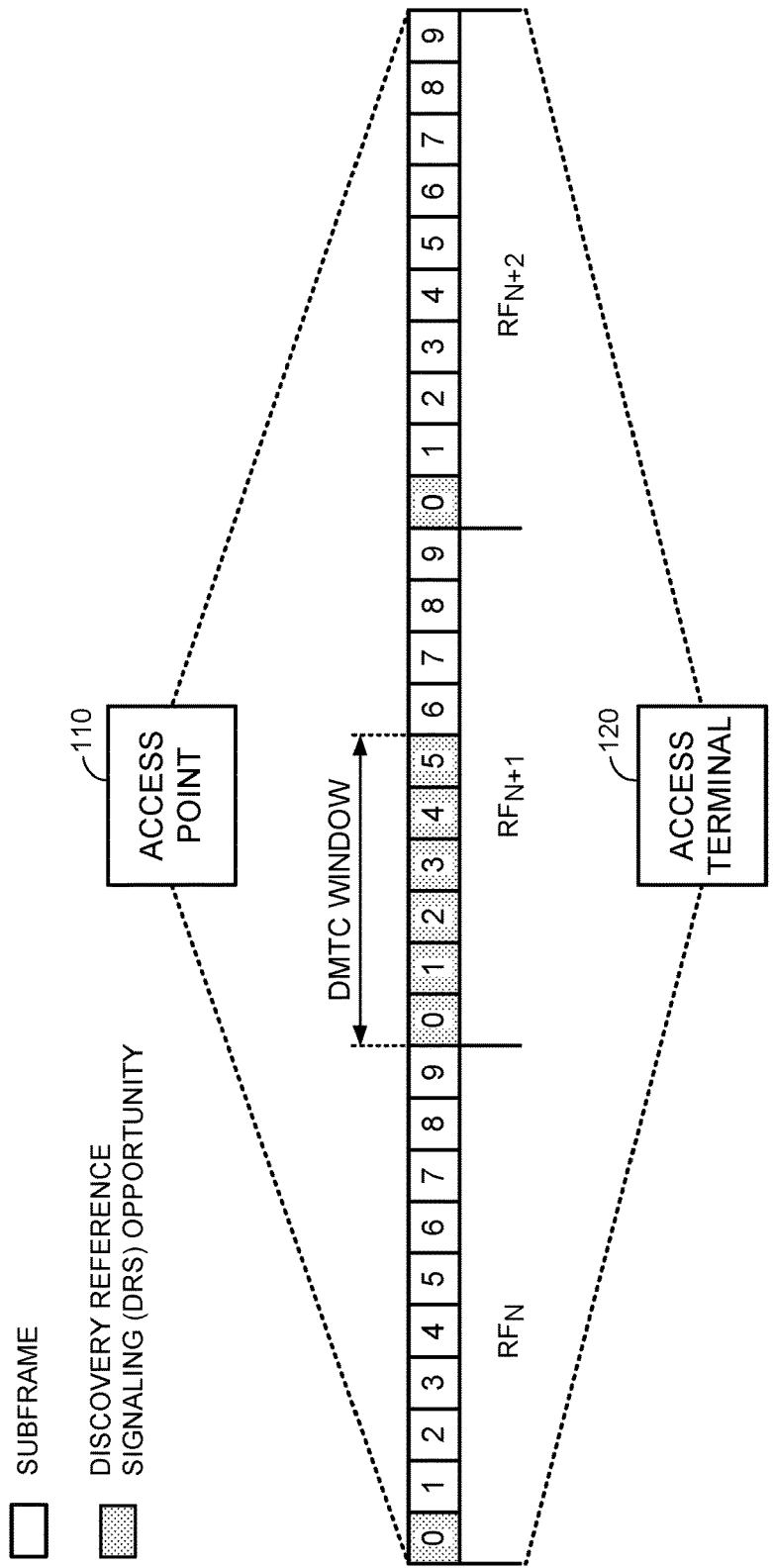

PAGING USER EQUIPMENTS ON A SHARED COMMUNICATION MEDIUM

CROSS-REFERENCE TO RELATED APPLICATIONS

The present Application for Patent claims the benefit of U.S. Provisional Application No. 62/462,212, entitled "PAGING FOR MULTEFIRE WITH COVERAGE ENHANCEMENT", filed Feb. 22, 2017, which is assigned to the assignee hereof and hereby expressly incorporated by reference herein in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may need to coexist with the operations of other Radio Access Technologies (RATs) that typically utilize the same unlicensed bands, most notably IEEE 802.11x WLAN technologies generally referred to as "Wi-Fi."

SUMMARY

An embodiment is directed to a method of paging user equipments (UEs) on a shared communication medium, including obtaining a set of paging messages for transmission to a paging group that includes a set of UEs associated with different coverage levels, transmitting a common enhanced Physical Downlink Control Channel (ePDCCH) that starts a Paging Occurrence Window (POW) with a duration that is extended from a legacy POW used by one or more legacy UEs, transmitting, after the transmission of the common ePDCCH, a paging ePDCCH, and repetitively transmitting the set of paging messages over a plurality of PDSCH subframes in accordance with the paging ePDCCH.

Another embodiment is directed to a method of paging UEs on a shared communication medium, including obtaining a first set of paging messages for transmission to a first paging group that includes a first set of UEs, obtaining a second set of paging messages for transmission to a second paging group that includes a second set of UEs, and establishing non-overlapping Paging Occasion Windows (POWs) for the first and second paging groups to avoid a paging ePDCCH collision.

Another embodiment is directed to an apparatus configured to page UEs on a shared communication medium, including means for obtaining a set of paging messages for transmission to a paging group that includes a set of UEs associated with different coverage levels, means for transmitting a common ePDCCH that starts a POW with a duration that is extended from a legacy POW used by one or more legacy UEs, means for transmitting, after the transmission of the common ePDCCH, a paging ePDCCH, and means for repetitively transmitting the set of paging messages over a plurality of PDSCH subframes in accordance with the paging ePDCCH.

Another embodiment is directed to an apparatus configured to page UEs on a shared communication medium, including means for obtaining a first set of paging messages for transmission to a first paging group that includes a first set of UEs, means for obtaining a second set of paging messages for transmission to a second paging group that includes a second set of UEs, and means for establishing non-overlapping Paging Occasion Windows (POWs) for the first and second paging groups to avoid a paging ePDCCH collision.

Another embodiment is directed to an apparatus configured to page UEs on a shared communication medium, including at least one processor coupled to at least one transceiver and configured to obtain a set of paging messages for transmission to a paging group that includes a set of UEs associated with different coverage levels, transmit a common ePDCCH that starts a POW with a duration that is extended from a legacy POW used by one or more legacy UEs, transmit, after the transmission of the common ePDCCH, a paging ePDCCH, and repetitively transmit the set of paging messages over a plurality of PDSCH subframes in accordance with the paging ePDCCH.

Another embodiment is directed to an apparatus configured to page UEs on a shared communication medium, including at least one processor coupled to at least one transceiver and configured to obtain a first set of paging messages for transmission to a first paging group that includes a first set of UEs, obtain a second set of paging messages for transmission to a second paging group that includes a second set of UEs, and establish non-overlapping Paging Occasion Windows (POWs) for the first and second paging groups to avoid a paging enhanced Physical Downlink Control Channel (ePDCCH) collision.

Another embodiment is directed to a non-transitory computer-readable medium containing instructions stored thereon, which, when executed by an apparatus configured to page UEs on a shared communication medium, causes the apparatus to perform operations, the instructions including at least one instruction configured to cause the apparatus to obtain a set of paging messages for transmission to a paging group that includes a set of UEs associated with different coverage levels, transmit a common ePDCCH that starts a POW with a duration that is extended from a legacy POW used by one or more legacy UEs, at least one instruction configured to cause the apparatus to transmit, after the transmission of the common ePDCCH, a paging ePDCCH, and at least one instruction configured to cause the apparatus to repetitively transmit the set of paging messages over a plurality of PDSCH subframes in accordance with the paging ePDCCH.

Another embodiment is directed to a non-transitory computer-readable medium containing instructions stored thereon, which, when executed by an apparatus configured to page UEs on a shared communication medium, causes the apparatus to perform operations, the instructions including at least one instruction configured to cause the apparatus to obtain a first set of paging messages for transmission to a first paging group that includes a first set of UEs, at least one instruction configured to cause the apparatus to obtain a second set of paging messages for transmission to a second paging group that includes a second set of UEs, and at least one instruction configured to cause the apparatus to establish non-overlapping POWs for the first and second paging groups to avoid a paging ePDCCH collision.

BRIEF DESCRIPTION OF THE DRAWINGS

The accompanying drawings are presented to aid in the description of various aspects of the disclosure and are provided solely for illustration of the aspects and not limitation thereof.

FIG. 2 illustrates an example frame structure that may be implemented for the primary RAT system on the communication medium to facilitate contention-based access to the communication medium.

DETAILED DESCRIPTION

Techniques for paging a user equipment (UE) on a radio link of a shared communication medium are disclosed. In an aspect, the radio link may be a Long-Term Evolution (LTE) in an unlicensed spectrum radio link.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
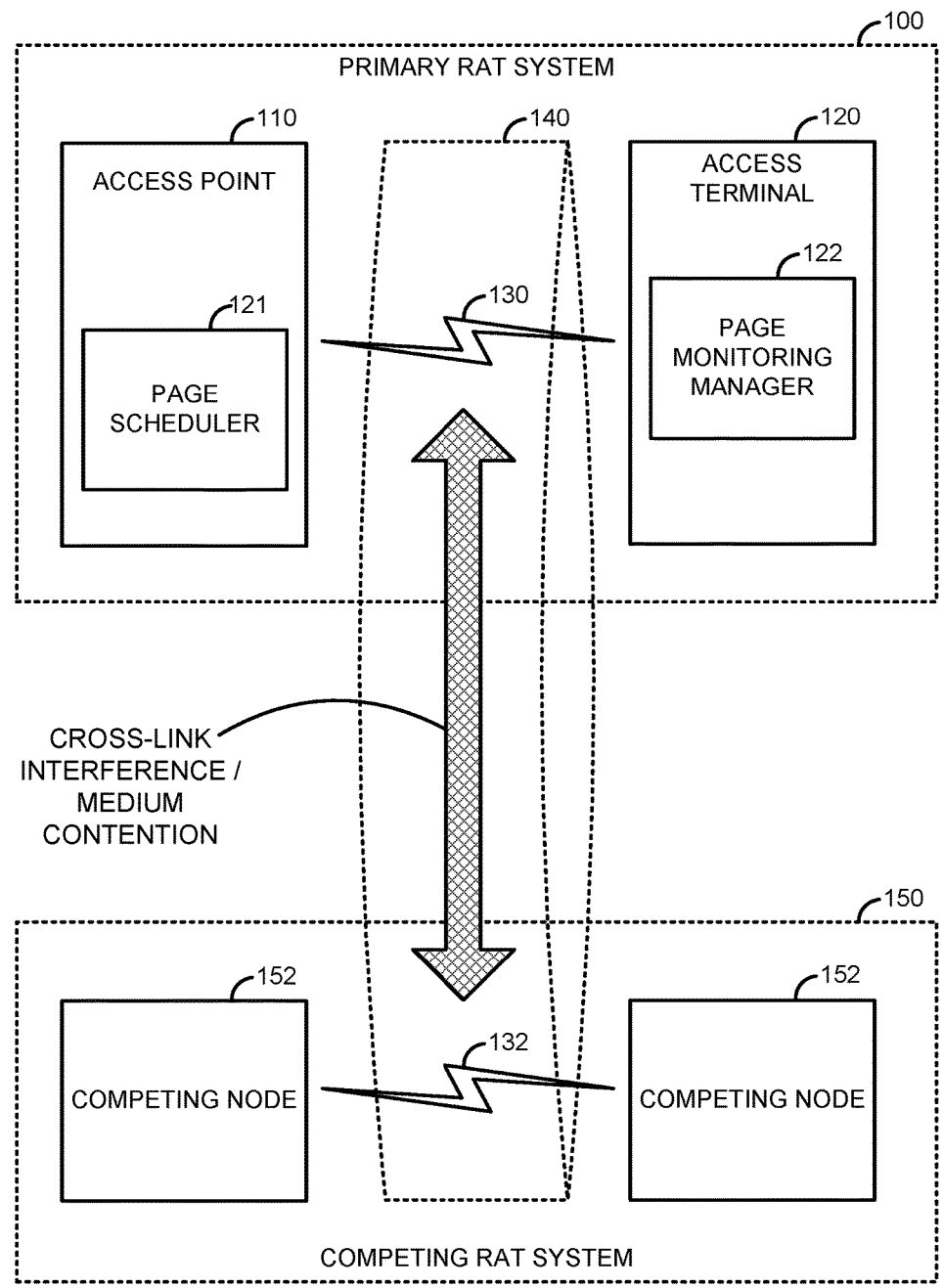
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a radio link, including information related to various types of communication (e.g., voice, data, multimedia services, associated control signaling, etc.). The primary RAT system 100 is shown as including an access point 110 and an access terminal 120 in communication with each other over a radio link 130. The competing RAT system 150 is shown as including two competing nodes 152 in communication with each other over a separate radio link 132, and may similarly include one or more access points, access terminals, or other types of wireless nodes. As an example, the access point 110 and the access terminal 120 of the primary RAT system 100 may communicate via the radio link 130 in accordance with Long Term Evolution (LTE) technology, while the competing nodes 152 of the competing RAT system 150 may communicate via the radio link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the radio link 130 used by the primary RAT system 100 and the radio link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the radio link 130 and the radio link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 may include a paging scheduler 121 and the access terminal 120 may include a page monitoring manager 122. The paging scheduler 121 may be configured to schedule page transmissions as described below in more detail, and the page monitoring manager 122 may be configured to facilitate receiving and decoding of paging messages at the access terminal 120.

FIG. 2 illustrates an example frame structure that may be implemented for the primary RAT system 100 on the communication medium 140 to facilitate contention-based access to the communication medium 140.

The illustrated frame structure includes a series of radio frames (RFs) that are numbered in accordance with a system frame number numerology ($RF_N$, $RF_{N+1}$, $RF_{N+2}$, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

In general, the example frame structure of FIG. 2 may be implemented as a Frequency Division Duplex (FDD) frame structure or a Time Division Duplex (TDD) frame structure. In an FDD frame structure, each subframe on a given frequency may be statically configured for uplink (UL) communication for transmitting uplink information from the access terminal 120 to the access point 110 or for downlink (DL) communication for transmitting downlink information from the access point 110 to the access terminal 120. In a TDD frame structure, each subframe may be variously operated at different times as a downlink (D), uplink (U), or special (S) subframe. Different arrangements of downlink, uplink, and special subframes may be referred to as different TDD configurations.

In some designs, the frame structure of FIG. 2 may be "fixed" in that the location of each subframe may be predetermined in relation to an absolute time, but may or may not be occupied by primary RAT signaling in any given instance due to the contention procedure for accessing the communication medium 140. For example, if the access point 110 or the access terminal 120 fails to win contention for a given subframe that subframe may be silenced. In other designs, however, the frame structure of FIG. 2 may be "floating" in that the location of each subframe may be dynamically determined in relation to the point at which access to the communication medium 140 is secured. For example, the start of a given frame (e.g., $RF_{N+1}$) may be delayed in relation to an absolute time until the access point 110 or the access terminal 120 is able to win contention.

As is further illustrated in FIG. 2, one or more subframes may be designated to include what is referred to herein as Discovery Reference Signaling (DRS). The DRS may be configured to convey reference signaling for facilitating system operation. The reference signaling may include information relevant to timing synchronization, system acquisition, interference measurements (e.g., Radio Resource Measurements (RRM)/Radio Link Measurements (RLM)), tracking loops, gain reference (e.g., Automatic Gain Control (AGC)), paging, etc. As an example, the DRS may include a Primary Synchronization Signal (PSS) and a Secondary Synchronization Signal (SSS) for cell searching, a Cell-specific Reference Signal (CRS) for RRM, a Physical Broadcast Channel (PBCH) for conveying various access parameters, and so on. The DRS may be scheduled for transmission periodically (e.g., every 10 ms) in a designated subframe(s) of each radio frame (e.g., subframe SF0) or in a range of such subframes referred to as a DRS Measurement Timing Configuration (DMTC) window defined around a designated subframe (e.g., spanning the first six subframes SF0 to SF5 of the radio frame).

For LTE operating in unlicensed spectrum, paging messages are broadcast on a Physical Downlink Shared Channel (PDSCH). The paging messages are scheduled via a Physical Downlink Control Channel (PDCCH) by allocating resources to the PDSCH. A common Paging Radio Network Temporary Identifier (P-RNTI) (which is not allocated to any particular UE or group of UEs) is used for paging. For example, the P-RNTI may be 16-bits in length with a fixed value (e.g., 65534 or 0xFFFE). Paging Occasion (PO) subframes carrying one or more paging messages may be scheduled by the ePDCCH within a Paging Occasion Window (POW). According to the MulteFire Alliance specification (e.g., MulteFire 1.0), the duration of the POW is permitted to be up to 10 ms.

In an embodiment, a common (or non-paging) ePDCCH (which may alternatively be referred to as a CePDCCH) carrying Downlink Control Information (DCI) may be signaled to UEs (e.g., format 1-C in Common Search Space (CSS)), and a paging ePDCCH may be used to indicate the time repetition (or locations) of the PDSCH where particular PO subframes including paging messages are carried within the POW. In an example, each ePDCCH (e.g., common or paging ePDCCH) can be configured as either an intra-transmission opportunity (TxOP) data scheduling ePDCCH or a multiple-TxOP data scheduling ePDCCH. The examples below describe the paging ePDCCH as a multiple-TxOP data scheduling ePDCCH, although in other embodiments an intra-TxOP data scheduling ePDCCH can be used. In an example, the paging ePDCCH may be scrambled using the P-RNTI to function as a paging signal for paging messaging. The paging ePDCCH does not carry the actual paging message, but rather indicates where paging messages will occur (e.g., the PO subframes) within one or more TxOPs on the PDSCH. Accordingly, paging messages are scheduled via the paging ePDCCH, and then later transmitted on the PDSCH with time repetition or a smaller transport block size (TBS).

Figure 3A:
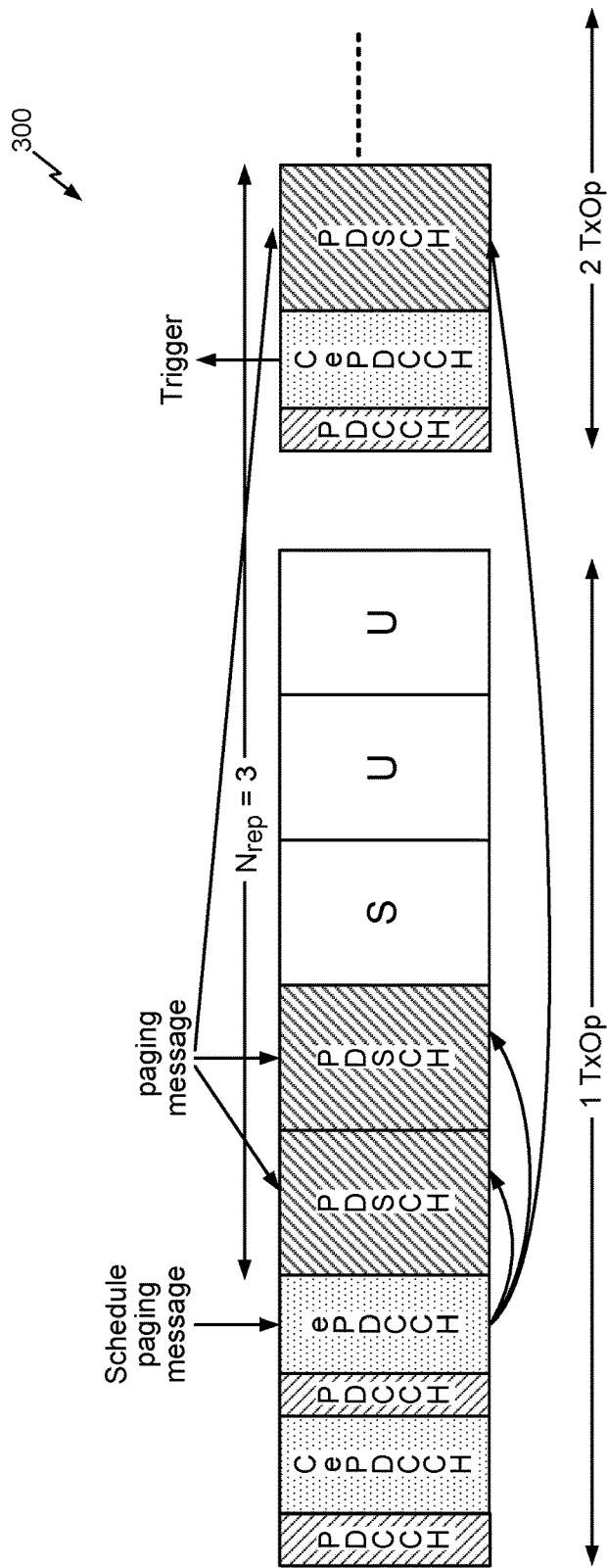
FIG. 3A depicts a timing diagram of a paging procedure where $N_{rep}=3$, with two PDSCH subframes carrying a set of paging messages (or PO subframe repetitions) occurring in a first TxOP (or 1 TxOP) and another PDSCH subframe carrying the set of paging messages (or PO subframe repetition) occurring in a second TxOP (or 2 TxOP).
Figure 3B:
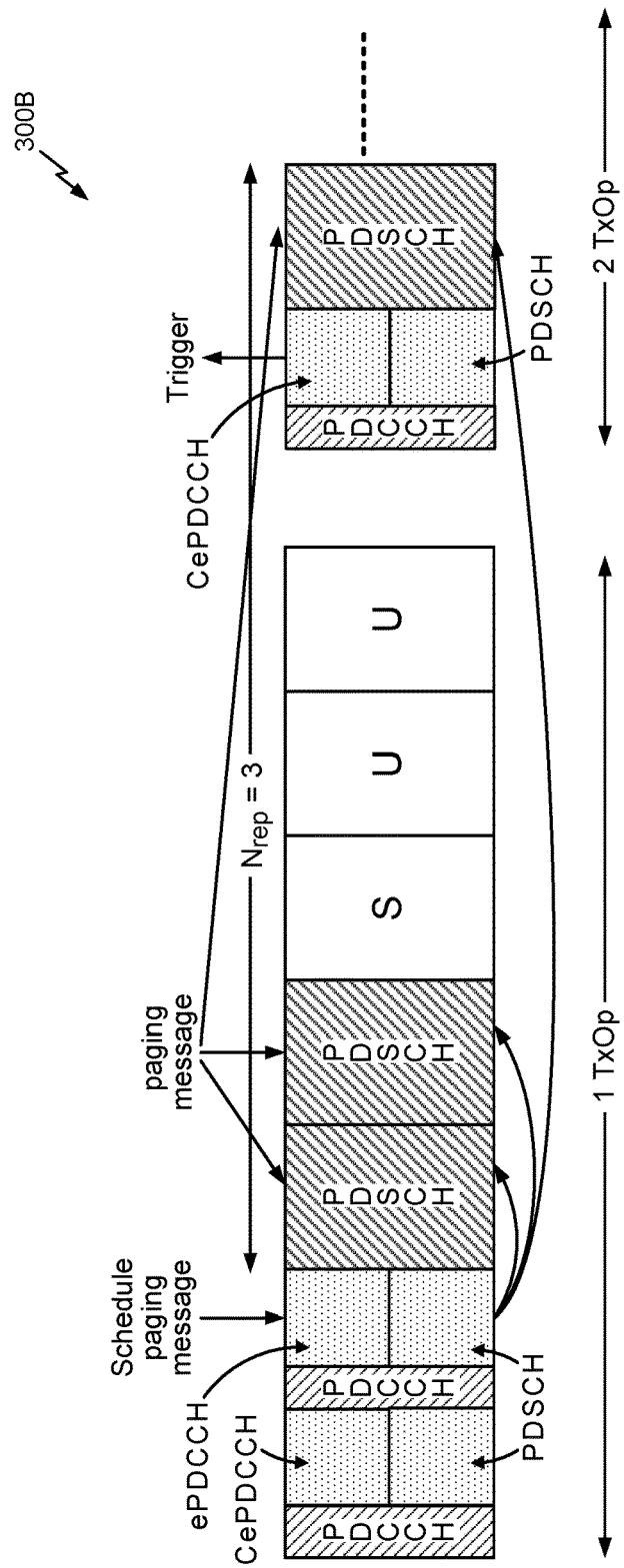
FIG. 3B depicts a timing diagram that is identical to the timing diagram of FIG. 3A, except each ePDCCH occupies only a portion of the PRBs in a respective subframe.

UEs are not typically made part of a paging group based on their coverage levels, which is why UEs with different coverage levels may be made part of the same paging group that is paged via the same resources (or PO subframes) on the PDSCH. The paging ePDCCH may use 1 CSS that is scrambled with the P-RNTI. The paging ePDCCH indicates the maximum repetition level $N_{rep}$ and TBS in DCI that is able to cover all the paged UEs of a particular paging group irrespective of each UE's respective coverage level. The paging message for each paged UE in the paging group is carried on the same payload of the PDSCH (which may repeat over $N_{rep}$ repetitions in the POW). Each UE monitors the paging ePDCCH at a coding rate (e.g., transport block size (TBS)) that is established to support the UE in the paging group with the worst coverage level (e.g., the lowest channel quality which may be based on SNR or any other well-known channel quality metric, which may be reported by the UEs to the access point to facilitate the coding rate determination). Similar to a multiple-TxOP data scheduling ePDCCH, the paging ePDCCH can schedule the paging message carrying repetition of PDSCHs in the current TxOP and (if needed) the next TxOP, as shown in FIG. 3A. FIG. 3A depicts a timing diagram 300 of a paging procedure where $N_{rep}$=3, with two PDSCH subframes carrying a set of paging messages (or PO subframe repetitions) occurring in a first TxOP (or 1 TxOP) and another PDSCH subframe carrying the set of paging messages (or PO subframe repetition) occurring in a second TxOP (or 2 TxOP). FIG. 3B depicts a timing diagram 300B that is identical to the timing diagram 300 of FIG. 3A, except each ePDCCH occupies only a portion of the PRBs in a respective subframe. So, in FIG. 3B, each ePDCCH is split from an associated PDSCH in terms of frequency, with each ePDCCH being transmitted on a first set of PRBs while a PDSCH is transmitted on a second set of PRBs in the same subframe.

In an embodiment, the paging ePDCCH may be multiplexed with the PDSCH in time only (not frequency), as shown in FIG. 3A. For example, an aggregation level 64 with 3 CSS+2 UE-specific SS may take up 80 Physical Resource Blocks (PRBs). Longer PDSCH paging repetitions (e.g., 8 or more repetitions) may be required to accommodate paging of a UE with a lowest coverage level in a particular paging group. Also, interrupts within a particular TxOP may require additional LBT and overhead. As noted above, the paging ePDCCH must occur within the POW, which is defined by MulteFire 1.0 up to 10 ms. It may be difficult for the paging ePDCCH to schedule the paging PDSCHs with a high repetition count (e.g., 8 or more repetitions) without collisions with ongoing downlink data transmissions on the PDSCH, and waiting to send the paging ePDCCH until after the ongoing downlink data transmissions may push the paging ePDCCH beyond the upper POW threshold of 10 ms.

Figure 4A:
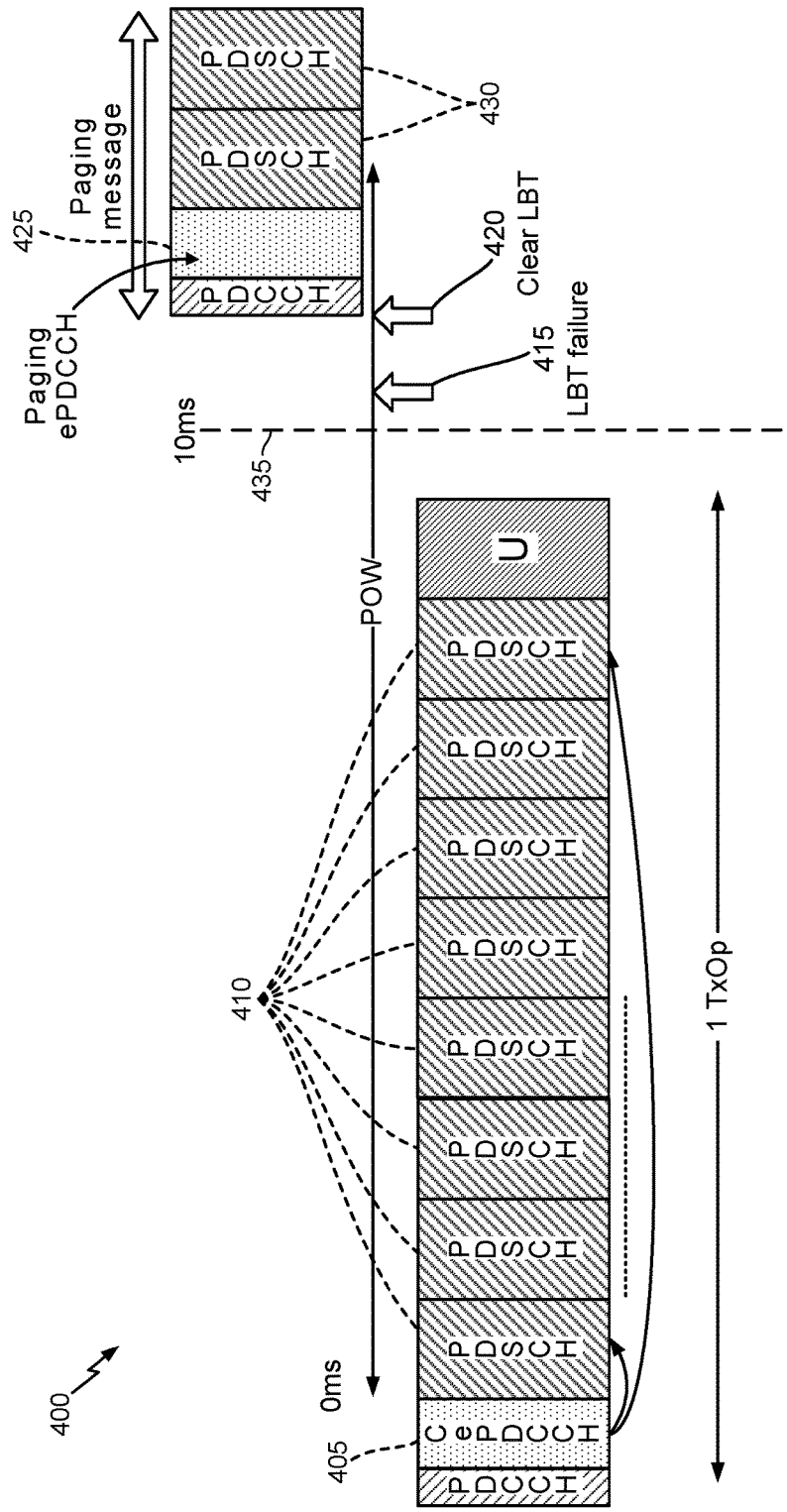
FIG. 4A illustrates a timing diagram depicting a paging procedure using an extended POW in accordance with an embodiment of the disclosure.

Embodiments of the disclosure are thereby directed to an extended POW. FIG. 4A illustrates a timing diagram 400 depicting a paging procedure using an extended POW in accordance with an embodiment of the disclosure. In particular, the paging ePDCCH is included within an extended portion of the extended POW (e.g., extended from a legacy POW used by one or more legacy UEs), while one or more paging PDSCH repetitions are permitted to occur outside of the extended POW.

Referring to FIG. 4A, the access point 110 transmits a common ePDCCH at 405, which starts the POW. The first 8 PDSCH subframes 410 of the POW are occupied by a downlink data transmission that blocks transmission of paging messages in any paging PDSCH repetitions. After the 8 PDSCH subframes 410 are transmitted, the access point 110 clears the shared communication medium via LBT (415-420). Once cleared, the access point 110 transmits a paging ePDCCH, 425, and then transmits a number of paging PDSCH repetitions, 430 (e.g., based on $N_{rep}$ as indicated in the paging ePDCCH of 425). The operations of 415-430 occur after the legacy POW threshold of 10 ms would have already elapsed, as noted at 435. In an example, the POW may be extended to be greater than 10 ms (e.g., POW=10*M ms, where M is an integer that is greater than or equal to 2) to permit more flexibility in sending the paging ePDCCH 425 and the associated paging PDSCH repetitions 430. As noted above with respect to FIGS. 3A-3B, a worst coverage level among UEs to be paged in association with a given POW may be used to establish the TBS, and may be used to establish the number of paging repetitions (e.g., $N_{rep}$).

Figure 4B:
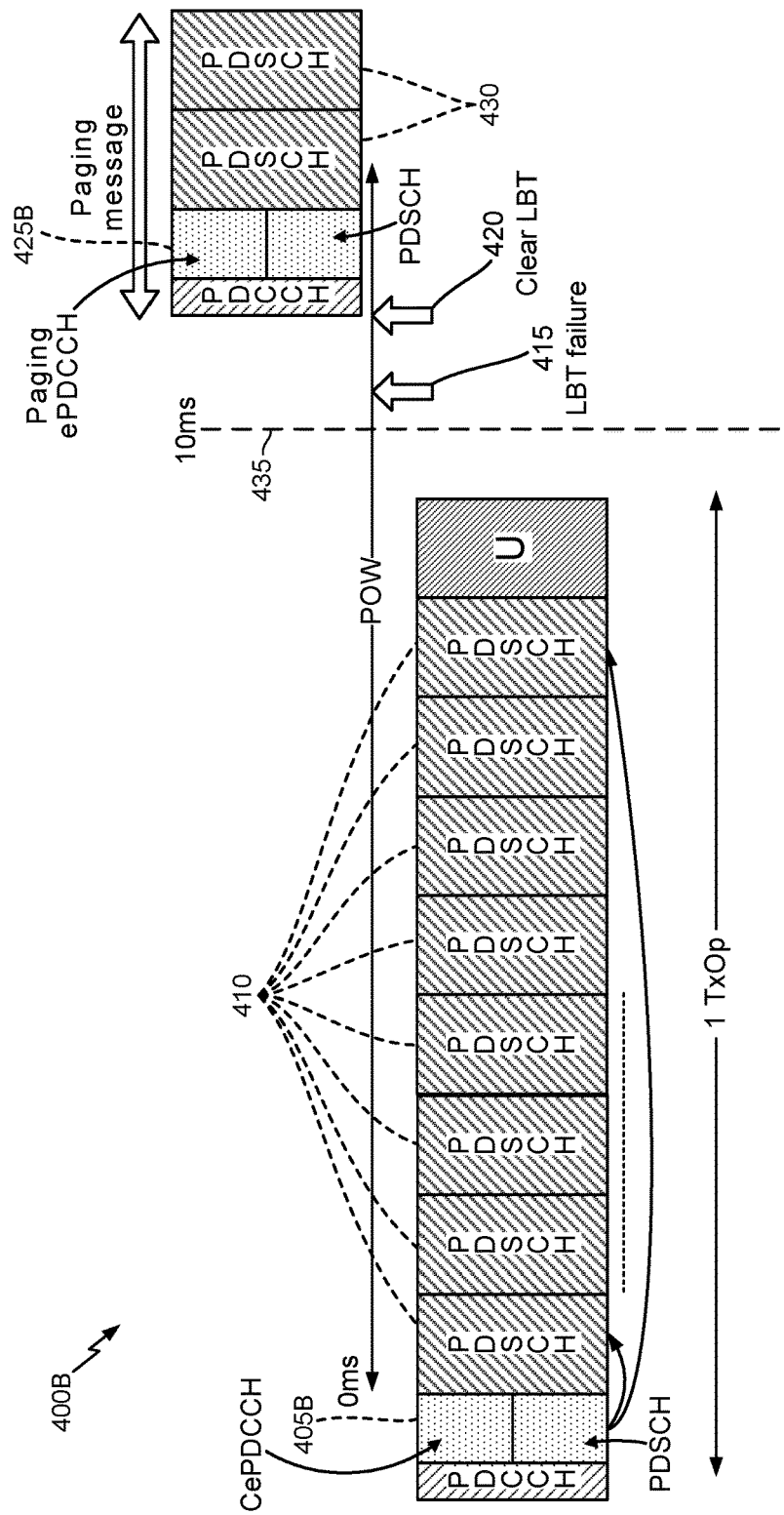
FIG. 4B depicts a timing diagram that is identical to the timing diagram of FIG. 4A, except each ePDCCH occupies only a portion of the PRBs in a respective subframe.

FIG. 4B depicts a timing diagram 400B that is identical to the timing diagram 400 of FIG. 4A, except each ePDCCH occupies only a portion of the PRBs in a respective subframe. So, in FIG. 4B, each ePDCCH is split from an associated PDSCH in terms of frequency, with each ePDCCH being transmitted on a first set of PRBs while a PDSCH is transmitted on a second set of PRBs in the same subframe. In particular, subframe 405B includes both a common ePDCCH and a PDSCH on separate PRBs, and subframe 425B includes both a paging ePDCCH and a PDSCH on separate PRBs.

Figure 4C:
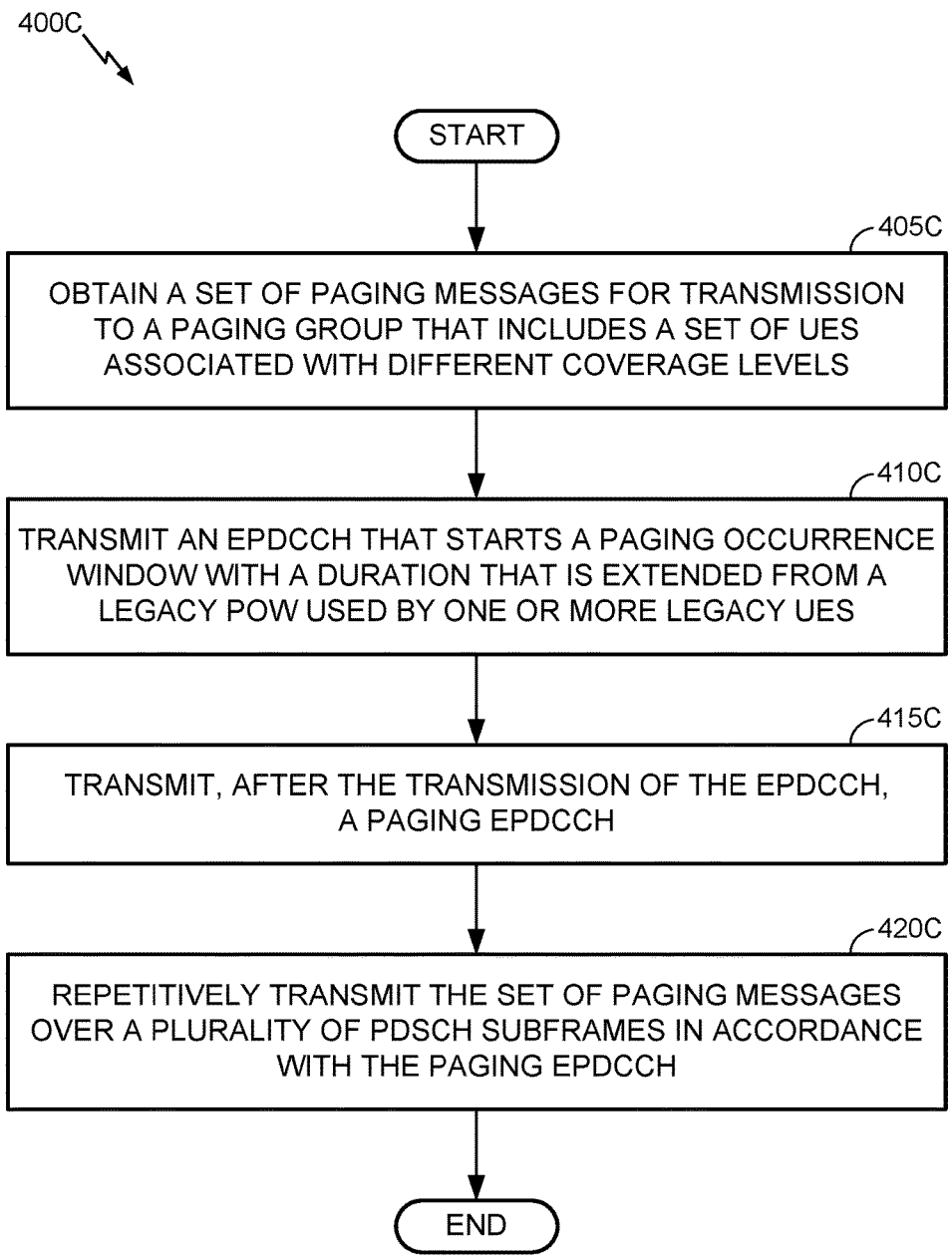
FIG. 4C illustrates a paging process in accordance with an embodiment of the disclosure.

FIG. 4C illustrates a paging process 400C in accordance with an embodiment of the disclosure. In an example, the process of FIG. 4C is performed by an access point, such as the access point 110 of FIG. 1. In an example, the process of FIG. 4C may result in the timing diagram 400 of FIG. 4A or 400B of FIG. 4B.

Referring to FIG. 4C, at block 405C, the access point obtains a set of paging messages for transmission to a paging group that includes a set of UEs associated with different coverage levels. At block 410C, the access point transmits a common ePDCCH (e.g., 405 of FIG. 4A or 405B of FIG. 4B) that starts a POW with a duration that is extended from a legacy POW used by one or more legacy UEs (e.g., MulteFire 1.0 UEs). At block 415C, the access point transmits, after the transmission of the ePDCCH of block 410C, a paging ePDCCH (e.g., 425 of FIG. 4A or 425B of FIG. 4B). At block 420C, the access point repetitively transmits the set of paging messages over a plurality of PDSCH subframes in accordance with the paging ePDCCH (e.g., 430 of FIG. 4A or FIG. 4B, which may occur after the POW elapses at 435). In an example, some or all of block 415, block 420C, or both may occur in the extended portion of the POW, i.e., after a legacy POW would have elapsed (e.g., at 435 in FIGS. 4A-4B).

Referring to FIG. 4C, as noted above, the access point may determine, based on a worst coverage level UE among the set of UEs, a transport block size (TBS) and a repetition number for transmission of the set of paging messages. The repetitive transmissions at block 420C may then be performed in accordance with the TBS and the repetition number. Moreover, each ePDCCH (e.g., ePDCCH, common ePDCCH, paging ePDCCH, etc.) may be transmitted on a first set of PRBs while a PDSCH is transmitted on a second set of PRBs in the same subframe, as in FIG. 4B. Alternatively, each ePDCCH may be transmitted without a PDSCH in the same subframe, as in FIG. 4A.

Within a particular DRX period, legacy MulteFire UEs may be divided into different Paging Frames (PFs) based on UE ID. A PF is a radio frame that may contain one or multiple PO subframes for sending a paging message used for paging and system information change notification. In LTE, for example, the location of a PF for the access terminal 120 (an LTE UE, in this example) is defined by certain paging parameters according to the following equation:

$$SFN \bmod T = (T/N)*(UE\_ID \bmod N) \quad \text{(Eq. 1)}$$

Here, T=min(UE specific DRX value, DefaultPagingCycle) and represents the minimum DRX cycle as between the UE-specific DRX cycle and the default, cell-specific DRX cycle. Meanwhile, N=min(T, nB) and represents the number of paging frames in a paging cycle of the UE, where nB={2T, T, T/2, T/4, T/8, T/16, T/32}. Finally, UE_ID=International Mobile Subscriber Identity (IMSI) mod 1024 and is used as a pseudorandom spacing value. The DefaultPagingCycle and nB parameters are broadcast in system information (SIB-2).

Figure 5A:
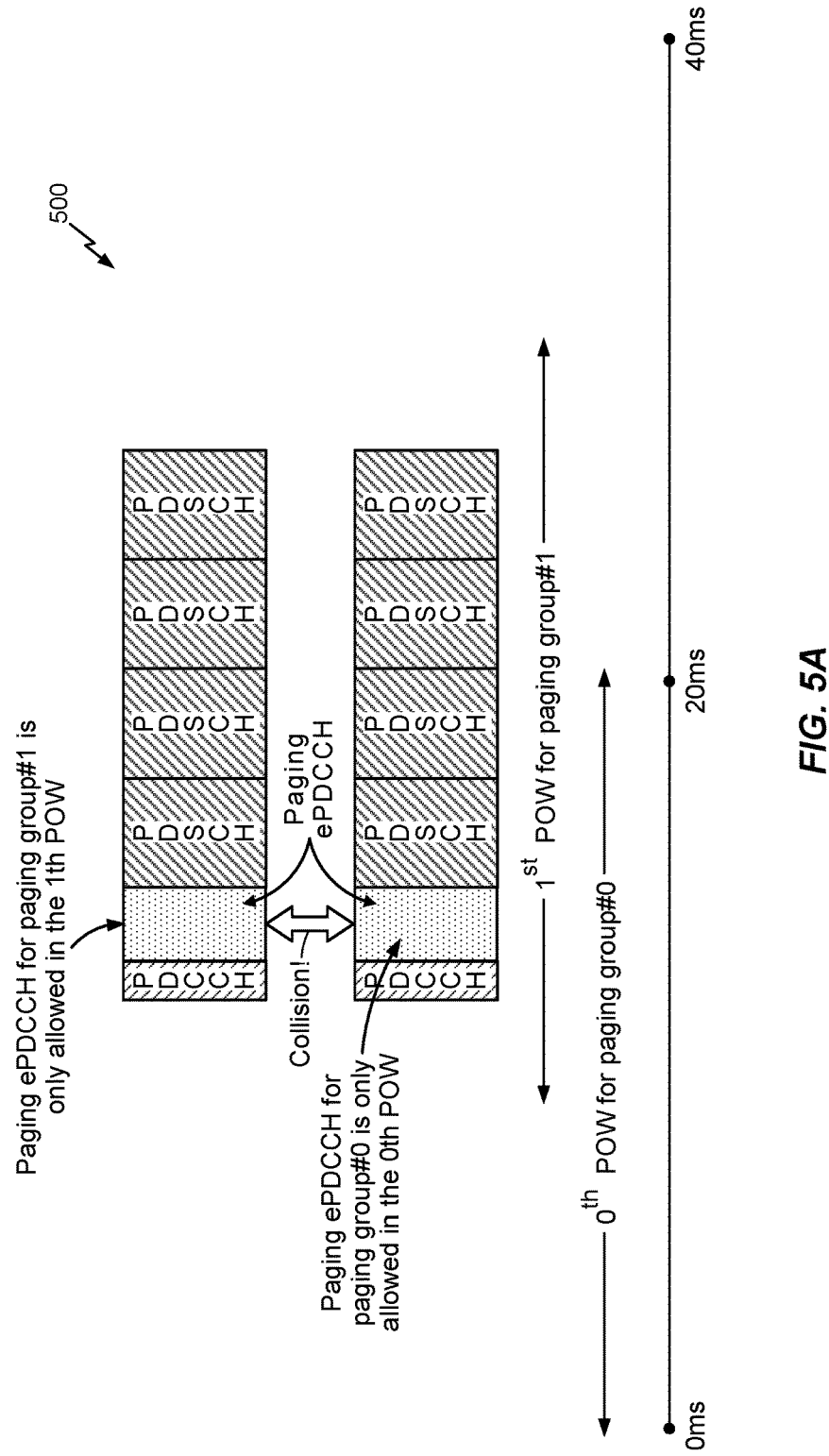
FIG. 5A illustrates a paging ePDCCH collision between a paging group #0 and a paging group #1 in accordance with an embodiment of the disclosure.
Figure 5B:
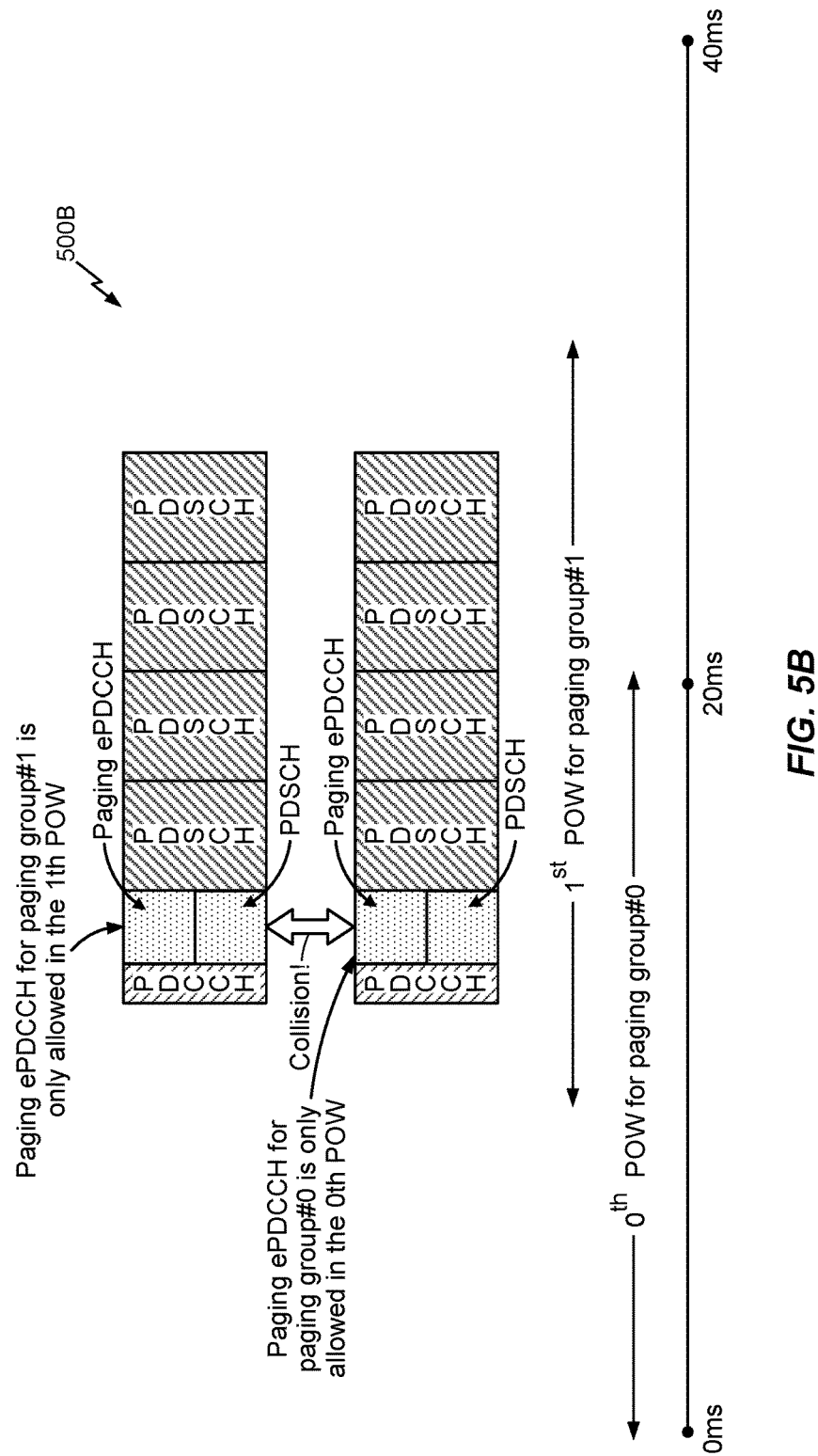
FIG. 5B illustrates a paging ePDCCH collision between a paging group #0 and a paging group #1 in accordance with another embodiment of the disclosure.

An extended POW may include multiple PFs. The PF noted above may constitute a starting frame for paging, which can be extended in accordance with the extended POW. The paging ePDCCHs for different paging groups may collide with each other due to LBT, and multiplexing in frequency may not be possible as noted above. For example, one paging ePDCCH may already occupy more than 64 PRBs. When POWs for different paging groups overlap, it is possible a paging collision (or paging ePDCCH collision) to occur. FIG. 5A illustrates a paging ePDCCH collision 500 between a paging group #0 and (a paging group #1 in accordance with an embodiment of the disclosure. FIG. 5B illustrates a paging ePDCCH collision 500B between a paging group #0 and a paging group #1 in accordance with another embodiment of the disclosure. FIG. 5B is identical to FIG. 5A, except each ePDCCH occupies only a portion of the PRBs in a respective subframe. So, in FIG. 5B, each ePDCCH is split from an associated PDSCH in terms of frequency, with each ePDCCH being transmitted on a first set of PRBs while a PDSCH is transmitted on a second set of PRBs in the same subframe.

Figure 6A:
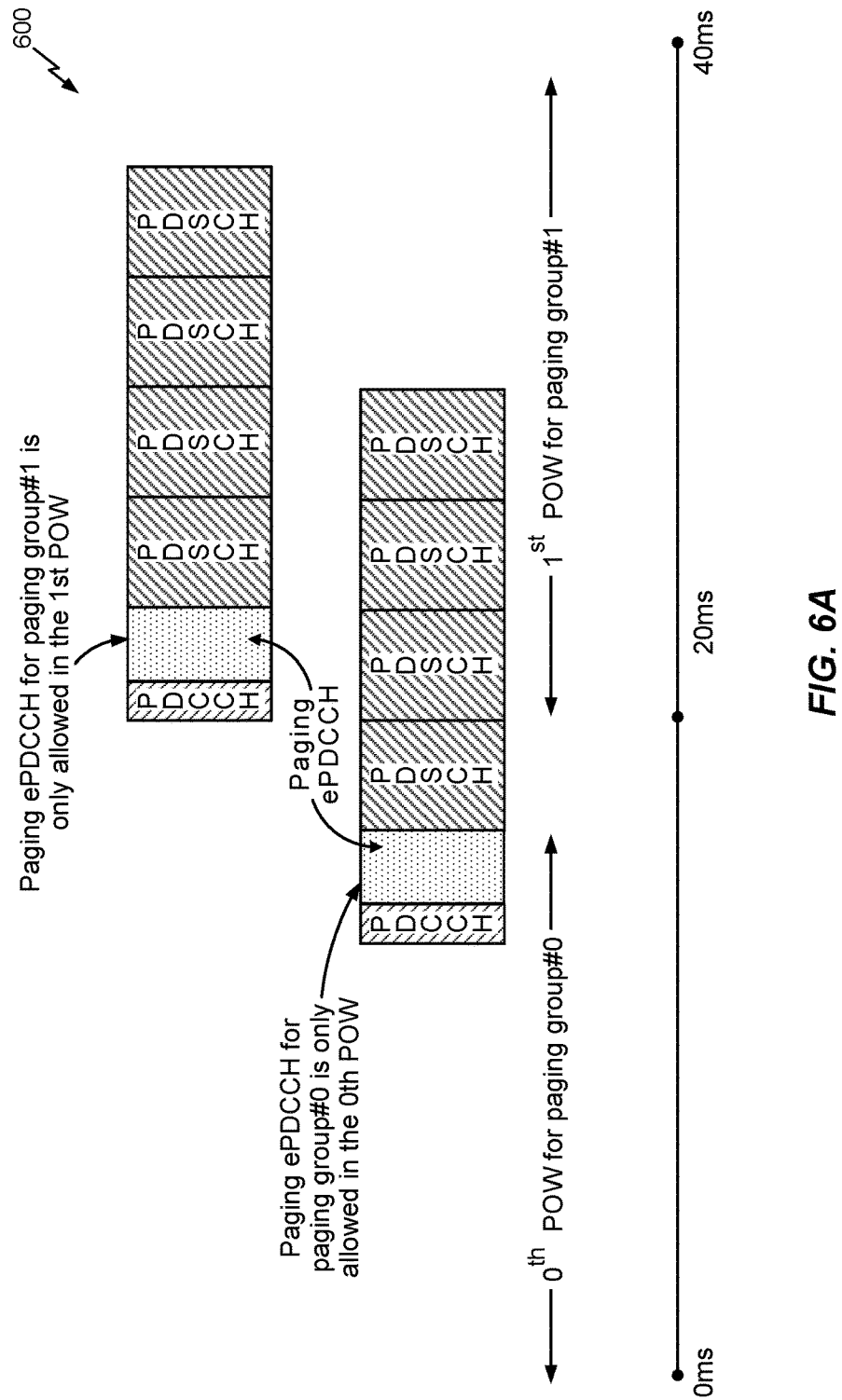
FIG. 6A illustrates a timing diagram depicting non-overlapping POWs in accordance with an embodiment of the disclosure.

FIG. 6A illustrates a timing diagram 600 depicting non-overlapping POWs in accordance with an embodiment of the disclosure. In the embodiment of FIG. 6A, the number of starting PFs per DRX period may be reduced to N=min(T, nB), so that the POWs of paging groups #0 and #1 do not overlap. Further, in the embodiment of FIG. 6A, the value of nB can be limited to $$\left\{ \frac{T}{M}, \frac{2T}{M}, \cdots, \frac{T}{32} \right\}.$$

The respective POWs for paging groups #0 and #1 may be set to P subframes, $$M = \left\lceil \frac{P}{10} \right\rceil.$$

As noted above, the paging ePDCCH is sent within a respective POW, so separating the $0^{th}$ and $1^{st}$ POWs as shown in FIG. 6A ensures that the paging ePDCCHs for paging groups #0 and #1 will not collide as in FIGS. 5A-5B.

Figure 6B:
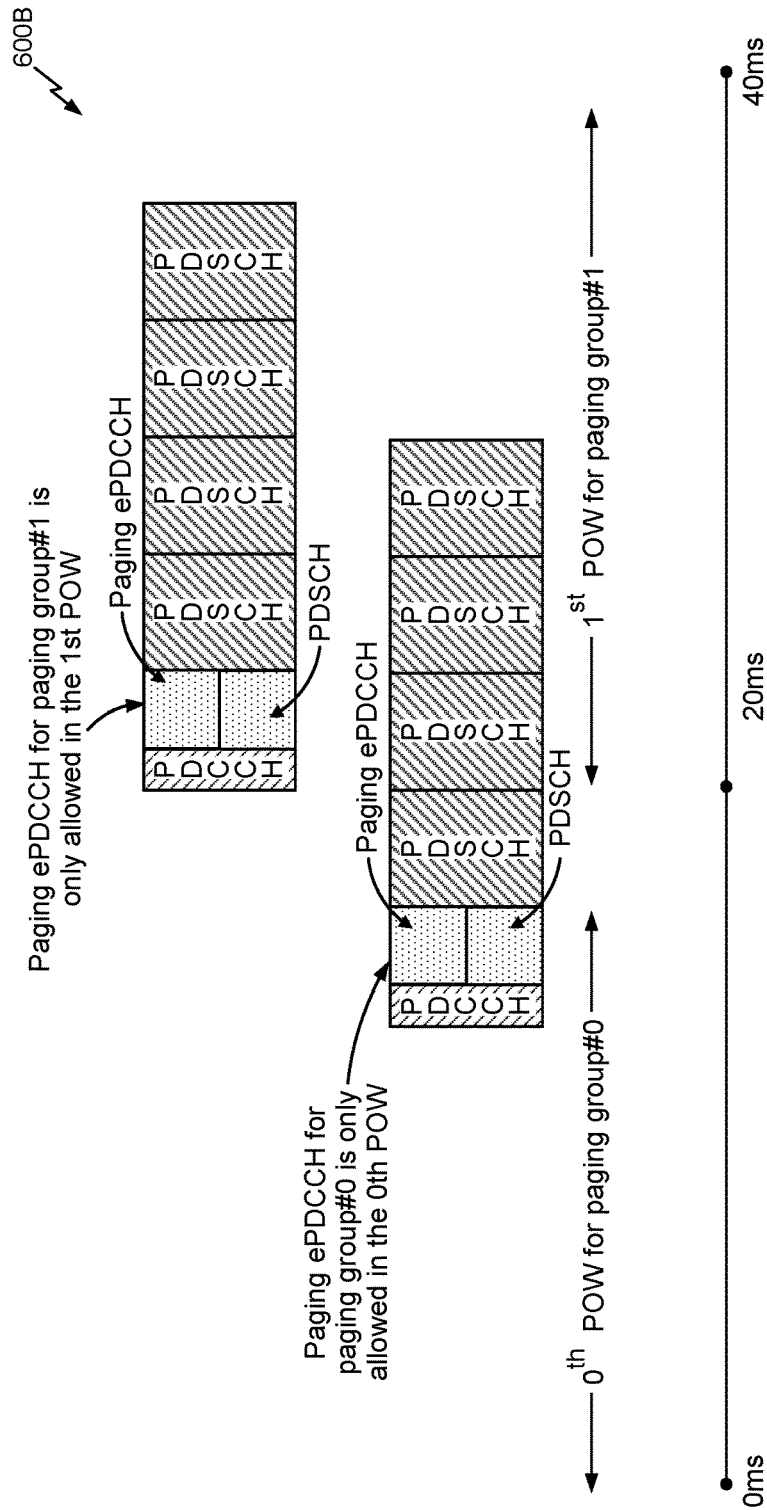
FIG. 6B illustrates a timing diagram depicting non-overlapping POWs in accordance with another embodiment of the disclosure.

FIG. 6B illustrates a timing diagram 600B depicting non-overlapping POWs in accordance with another embodiment of the disclosure. FIG. 6B is identical to FIG. 6A, except each ePDCCH occupies only a portion of the PRBs in a respective subframe. So, in FIG. 6B, each ePDCCH is split from an associated PDSCH in terms of frequency, with each ePDCCH being transmitted on a first set of PRBs while a PDSCH is transmitted on a second set of PRBs in the same subframe.

Figure 6C:
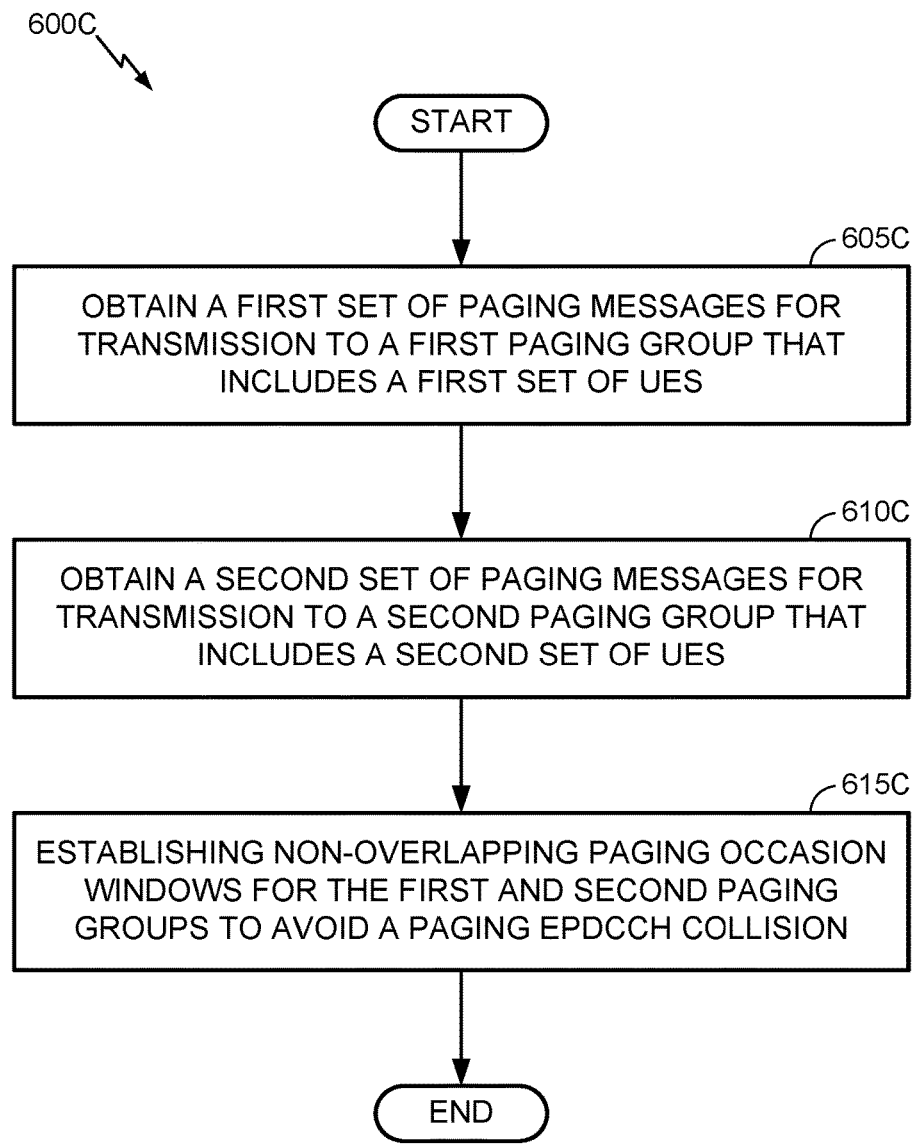
FIG. 6C illustrates a paging process in accordance with an embodiment of the disclosure.

FIG. 6C illustrates a paging process 600C in accordance with an embodiment of the disclosure. In an example, the process of FIG. 6C is performed by an access point, such as the access point 110 of FIG. 1. In an example, the process of FIG. 6C may result in the timing diagram 600 of FIG. 6A or 600B of FIG. 6B.

Referring to FIG. 6C, at block 605C, the access point obtains a first set of paging messages for transmission to a first paging group (e.g., paging group #0 in FIGS. 6A-6B)

that includes a first set of UEs. At block 610C, the access point obtains a second set of paging messages for transmission to a second paging group (e.g., paging group #1 in FIGS. 6A-6B) that includes a second set of UEs. At block 615C, the access point establishes non-overlapping Paging Occasion Windows (POWs) for the first and second paging groups to avoid a paging ePDCCH collision (e.g., as shown in FIGS. 6A-6B, whereby the POWs are staggered to avoid a paging ePDCCH collision). In an example, block 615C may establish the non-overlapping POWs in part by reducing a number of starting Paging Frames (PFs) per DRX period.

While not shown expressly in FIG. 6C, the access point may further transmit, in a first POW, a first paging ePDCCH that schedules the first set of paging messages to the first set of UEs, and may further transmit, in a second POW, a second paging ePDCCH that schedules the second set of paging messages to the second set of UEs. Based on block 615C, the first and second paging ePDCCH are offset from each other to avoid the ePDCCH collision. Moreover, each ePDCCH (e.g., the first and second paging ePDCCH) may be transmitted on a first set of PRBs while a PDSCH is transmitted on a second set of PRBs in the same subframe, as in FIG. 6B. Alternatively, each ePDCCH may be transmitted without a PDSCH in the same subframe, as in FIG. 6A.

In an embodiment, the paging protocols described above may be configured to extend MulteFire coverage for deployment within industrial IoT networks and/or automated guided vehicles (AGV) networks. For example, certain AGVs specify a minimum operating bandwidth of 150 kbps with 3× the amount of coverage relative to Wi-Fi or IEEE 802.11 (e.g., 16 dB gain needed over Wi-Fi, SNR requirement of −14 dB), and the above-noted paging protocols can satisfy these requirements.

Figure 7:
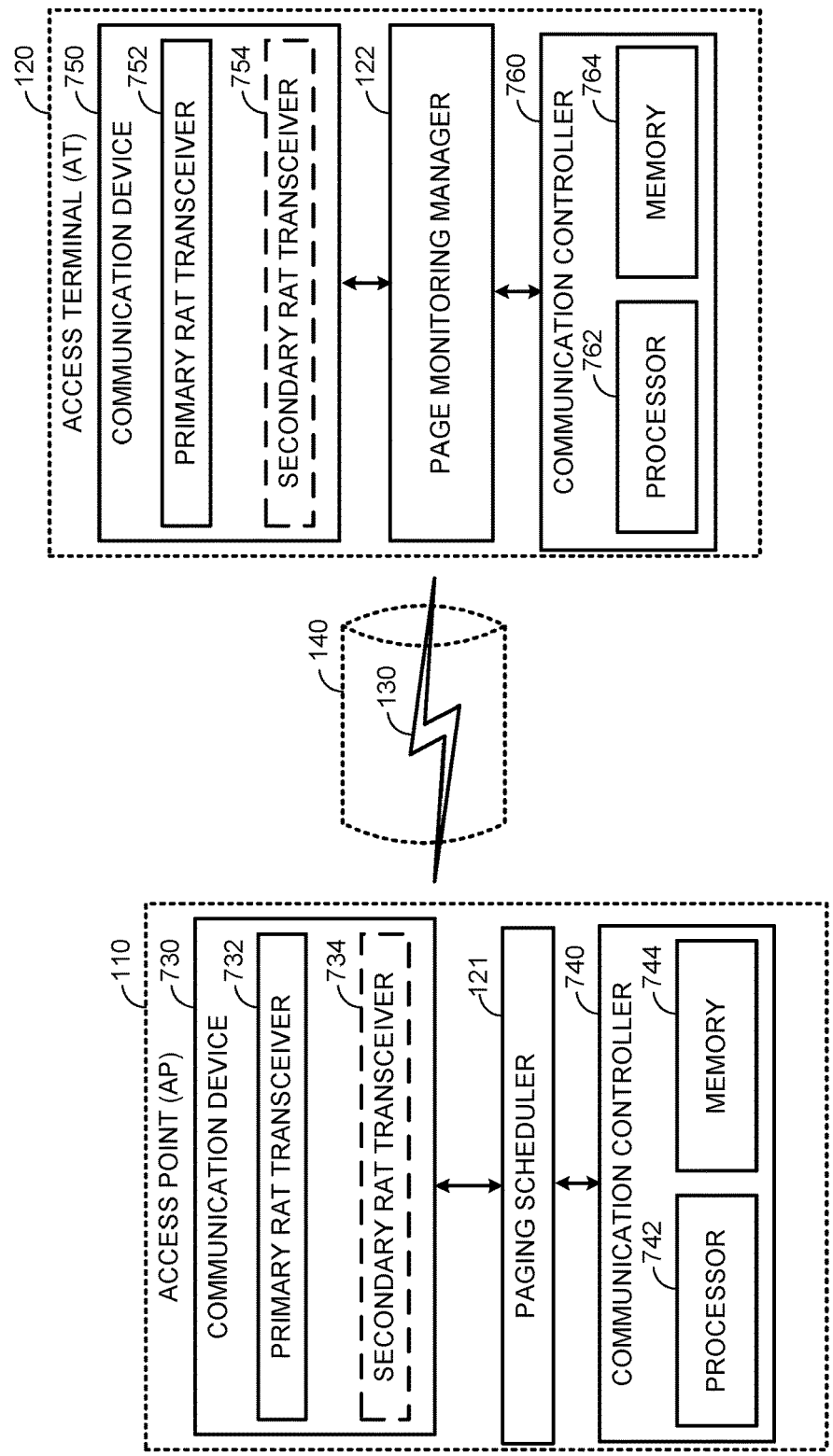
FIG. 7 is a device-level diagram illustrating example components of the access point and the access terminal of the primary RAT system of FIG. 1 in more detail.

FIG. 7 is a device-level diagram illustrating example components of the access point 110 and the access terminal 120 of the primary RAT system 100 in more detail. As shown, the access point 110 and the access terminal 120 may each generally include a wireless communication device (represented by the communication devices 730 and 750) for communicating with other wireless nodes via at least one designated RAT. The communication devices 730 and 750 may be variously configured for transmitting and encoding signals, and, conversely, for receiving and decoding signals in accordance with the designated RAT (e.g., messages, indications, information, pilots, and so on).

The communication devices 730 and 750 may include, for example, one or more transceivers, such as respective primary RAT transceivers 732 and 752, and, in some designs, (optional) co-located secondary RAT transceivers 734 and 754, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 740 and 760) for controlling operation of their respective communication devices 730 and 750 (e.g., directing, modifying, enabling, disabling, etc.). The communication controllers 740 and 760 may include one or more processors 742 and 762, and one or more memories 744 and 764 coupled to the processors 742 and 762, respectively. The memories 744 and 764 may be configured to store data, instructions, or a combination thereof, either as on-board cache memory, as separate components, a combination, etc. The processors 742 and 762 and the memories 744 and 764 may be standalone communication components or may be part of the respective host system functionality of the access point 110 and the access terminal 120.

It will be appreciated that the paging scheduler 121 may be implemented in different ways. In some designs, some or all of the functionality associated therewith may be implemented by or otherwise at the direction of at least one processor (e.g., one or more of the processors 742), at least one memory (e.g., one or more of the memories 744), at least one transceiver (e.g., one or more of the transceivers 732 and 734), or a combination thereof. In other designs, some or all of the functionality associated therewith may be implemented as a series of interrelated functional modules.

It will be appreciated that the page monitoring manager 122 may be implemented in different ways. In some designs, some or all of the functionality associated therewith may be implemented by or otherwise at the direction of at least one processor (e.g., one or more of the processors 762), at least one memory (e.g., one or more of the memories 764), at least one transceiver (e.g., one or more of the transceivers 752 and 754), or a combination thereof. In other designs, some or all of the functionality associated therewith may be implemented as a series of interrelated functional modules.

Accordingly, it will be appreciated that the components in FIG. 7 may be used to perform operations described above with respect to FIGS. 1-6C.

Figure 8:
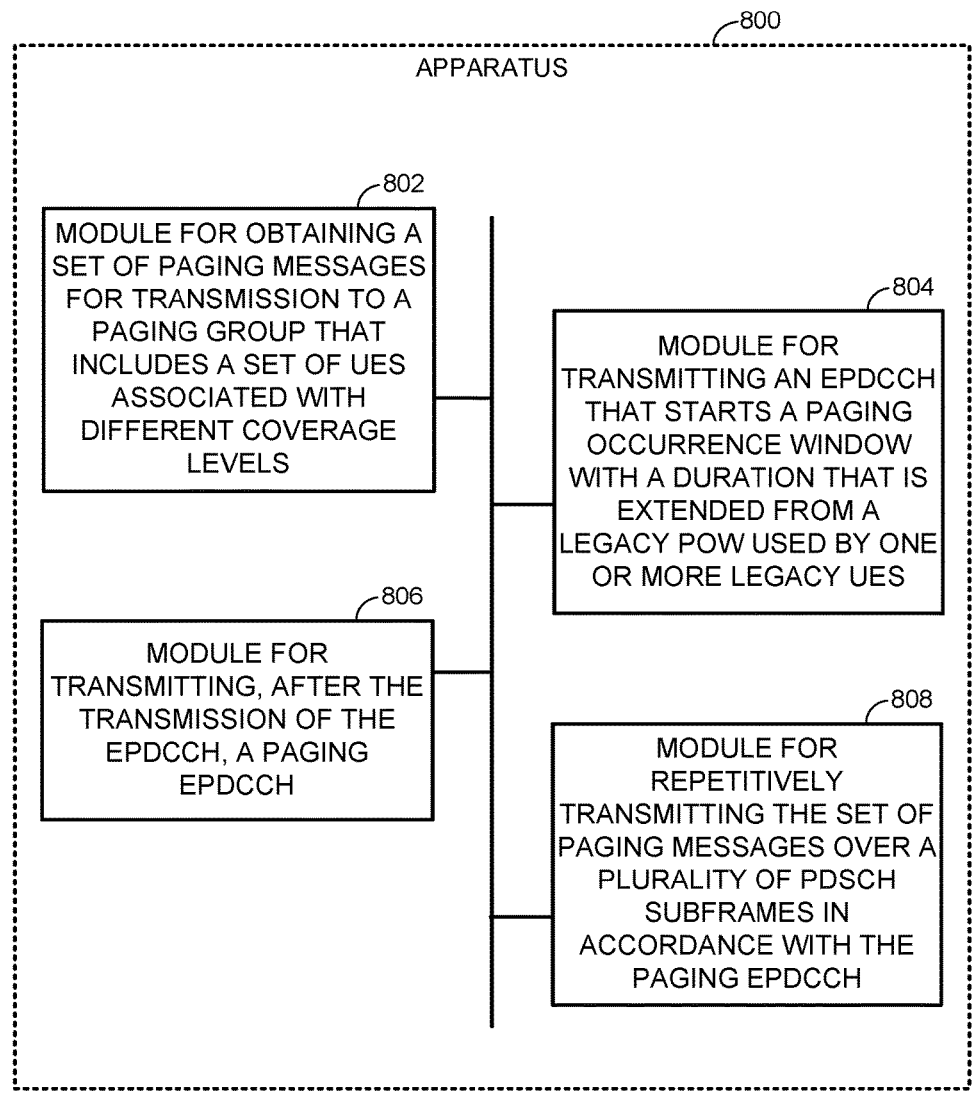
FIG. 8 illustrates an example apparatus for implementing the page scheduling techniques discussed herein (e.g., with respect to FIGS. 4A-4C) at an access point represented as a series of interrelated functional modules in accordance with an embodiment of the disclosure.

FIG. 8 illustrates an example apparatus 800 for implementing the page scheduling techniques discussed herein (e.g., with respect to FIGS. 4A-4C) at an access point represented as a series of interrelated functional modules in accordance with an embodiment of the disclosure. In the illustrated example, the apparatus 800 includes a module for obtaining 802, a module for transmitting 804, a module for transmitting 806 and a module for repetitively transmitting 808.

The module for obtaining 802 may be configured to obtain a set of paging messages for transmission to a paging group that includes a set of UEs associated with different coverage levels. The module for transmitting 804 may be configured to transmit a common ePDCCH (e.g., 405 of FIG. 4A or 405B of FIG. 4B) that starts a POW with a duration that is extended from a legacy POW used by one or more legacy UEs (e.g., MulteFire 1.0 UEs). The module for transmitting 806 may be configured to transmit, after the transmission of the ePDCCH by the module for transmitting 804, a paging ePDCCH (e.g., 425 of FIG. 4A or 425B of FIG. 4B). The module for repetitively transmitting 808 may be configured to repetitively transmit the set of paging messages over a plurality of PDSCH subframes in accordance with the paging ePDCCH (e.g., 430 of FIG. 4A or FIG. 4B, which may occur after the POW elapses at 435).

Figure 9:
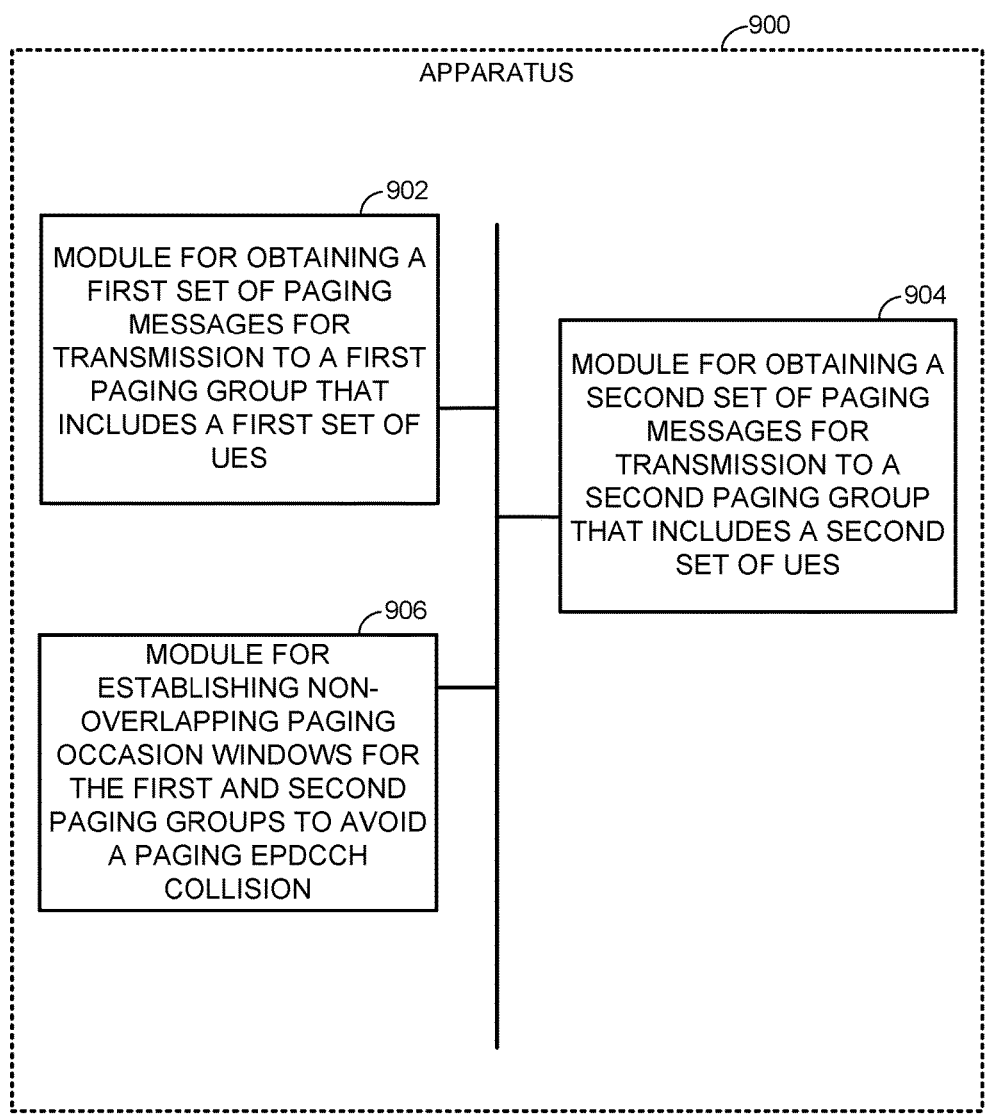
FIG. 9 illustrates an example apparatus for implementing the page scheduling techniques discussed herein (e.g., with respect to FIGS. 6A-6C) at an access point represented as a series of interrelated functional modules in accordance with an embodiment of the disclosure.

FIG. 9 illustrates an example apparatus 900 for implementing the page scheduling techniques discussed herein (e.g., with respect to FIGS. 6A-6C) at an access point represented as a series of interrelated functional modules in accordance with an embodiment of the disclosure. In the illustrated example, the apparatus 900 includes a module for obtaining 902, a module for obtaining 904, and a module for establishing 906.

The module for obtaining 902 may be configured to obtain a first set of paging messages for transmission to a first paging group (e.g., paging group #0 in FIGS. 6A-6B) that includes a first set of UEs. The module for obtaining 904 may be configured to obtain a second set of paging messages for transmission to a second paging group (e.g., paging group #1 in FIGS. 6A-6B) that includes a second set of UEs. The module for establishing 906 may be configured to establish non-overlapping Paging Occasion Windows (POWs) for the first and second paging groups to avoid a paging ePDCCH collision (e.g., as shown in FIGS. 6A-6B, whereby the POWs are staggered to avoid a paging ePDCCH collision).

The functionality of the modules of FIGS. 8-9 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 8-9, as well as other components and functions described herein, may be implemented using any suitable means. Such means also may be implemented, at least in part, using corresponding structure as taught herein. For example, the components described above in conjunction with the "module for" components of FIGS. 8-9 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well as in sequences of actions that may be represented by pseudocode. For example, the components and functions represented by FIGS. 8-9 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of paging user equipments (UEs) on a shared communication medium, comprising:
   obtaining a set of paging messages for transmission to a paging group that includes a set of UEs associated with different coverage levels;
   transmitting a common enhanced Physical Downlink Control Channel (ePDCCH) that starts a Paging Occurrence Window (POW) with a duration that is extended from a legacy POW used by one or more legacy UEs;
   transmitting, after the transmission of the common ePDCCH, a paging ePDCCH; and
   repetitively transmitting the set of paging messages over a plurality of PDSCH subframes in accordance with the paging ePDCCH.

2. The method of claim 1, further comprising:
   determining, based on a worst coverage level UE among the set of UEs, a transport block size (TBS) and a repetition number for transmission of the set of paging messages,
   wherein the repetitively transmitting transmits the set of paging messages in accordance with the TBS and the repetition number.

3. The method of claim 1, wherein the common ePDCCH is transmitted on a first set of physical resource blocks (PRBs) and a PDSCH is transmitted on a second set of PRBs in the same subframe.

4. The method of claim 1, wherein the paging ePDCCH is transmitted on a first set of physical resource blocks (PRBs) and a PDSCH is transmitted on a second set of PRBs in the same subframe.

5. The method of claim 1, wherein one or more of the plurality of PDSCH subframes carrying the repetitive transmissions of the set of paging messages are transmitted in the extended portion of the POW after the legacy POW.

6. An apparatus configured to page user equipments (UEs) on a shared communication medium, comprising:
   at least one processor coupled to at least one transceiver and configured to:
      obtain a set of paging messages for transmission to a paging group that includes a set of UEs associated with different coverage levels;
      transmit a common enhanced Physical Downlink Control Channel (ePDCCH) that starts a Paging Occurrence Window (POW) with a duration that is extended from a legacy POW used by one or more legacy UEs;
      transmit, after the transmission of the common ePDCCH, a paging ePDCCH; and
      repetitively transmit the set of paging messages over a plurality of PDSCH subframes in accordance with the paging ePDCCH.

7. The apparatus of claim 6, wherein the at least one processor is further configured to:
   determine, based on a worst coverage level UE among the set of UEs, a transport block size (TBS) and a repetition number for transmission of the set of paging messages,
   wherein the at least one processor is configured to repetitively transmit the set of paging messages in accordance with the TBS and the repetition number.

8. The apparatus of claim 6, wherein the common ePDCCH is transmitted on a first set of physical resource blocks (PRBs) and a PDSCH is transmitted on a second set of PRBs in the same subframe.

9. The apparatus of claim 6, wherein the paging ePDCCH is transmitted on a first set of physical resource blocks (PRBs) and a PDSCH is transmitted on a second set of PRBs in the same subframe.

10. The apparatus of claim 6, wherein one or more of the plurality of PDSCH subframes carrying the repetitive transmissions of the set of paging messages are transmitted in the extended portion of the POW after the legacy POW.

* * * * *